W. J. HUTCHINSON.
FEEDER FOR THRESHING MACHINES, CLOVER MILLS, AND THE LIKE.
APPLICATION FILED JAN. 8, 1912.

1,033,590.

Patented July 23, 1912.

2 SHEETS—SHEET 1.

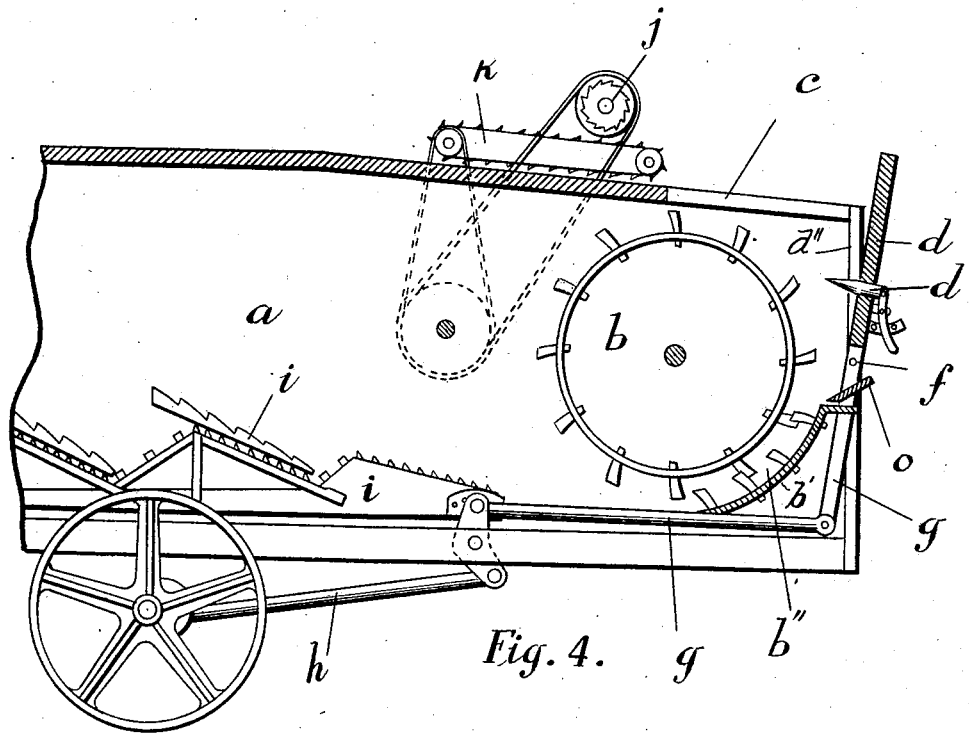
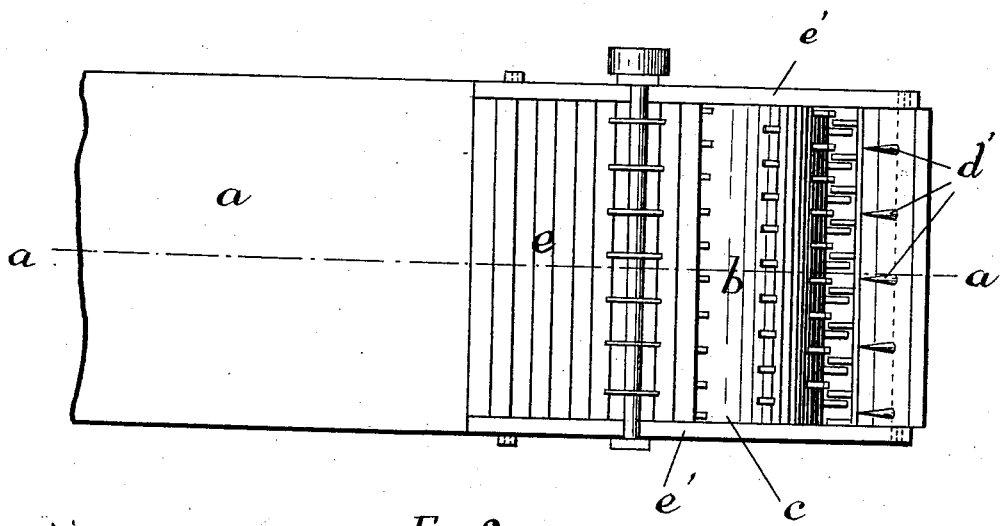

UNITED STATES PATENT OFFICE.

WILLIAM J. HUTCHINSON, OF CALEDON EAST, ONTARIO, CANADA.

FEEDER FOR THRESHING-MACHINES, CLOVER-MILLS, AND THE LIKE.

1,033,590.  Specification of Letters Patent.  Patented July 23, 1912.

Application filed January 8, 1912. Serial No. 670,087.

*To all whom it may concern:*

Be it known that I, WILLIAM J. HUTCHINSON, of Caledon East, in the county of Peel and Province of Ontario, Dominion of Canada, have invented certain new and useful Improvements in Feeders for Threshing-Machines, Clover-Mills, and the Like; and I hereby declare that the following is a full, clear, and exact description of the same.

Heretofore, it has been customary to provide this class of agricultural machinery with a feeder placed in front of the cylinder and comprising a continuously traveling carrier, upon which the bundles, sheaves, etc., are deposited to be fed to the band cutter and then to the cylinder, and in certain types of these machines, a revolving retarder has been provided to prevent the bundles, etc., from slugging the machine. Owing however, to the continuous delivery by the carrier, the bundles have piled up in front of the cylinder, and the pressure on the material detained by the retarding has frequently become so great that the material has been forced past the retarder to the cylinder, and the concave has then become congested and the cylinder slugged. It has also been customary to attach the feeder to the feeding end of the machine in front of the cylinder, and owing to the complex character and weight of the feeder, heavy strain has been imposed on the machine, and its cost of manufacture has been correspondingly increased.

The object of my invention therefore, is to provide a threshing machine with a feeder which will not add appreciably either to the weight of the machine or to its cost of manufacture, and to so arrange this feeder that it will effect a positive delivery of the bundles to the cylinder and retain them in contact therewith while the material is combed away, the delivery of the material to the cylinder corresponding to its combing capacity.

In carrying out my invention, I provide the feeding end of the threshing machine with a carrier placed above and in rear of the feed opening, to deliver the bundles, etc., thereto, and I combine with this carrier, a feeder, which automatically moves away from the cylinder for the delivery of the bundles from the carrier to the cylinder, and then automatically moves toward the cylinder to press and hold the bundles against the cylinder while being combed away.

Figure 1:
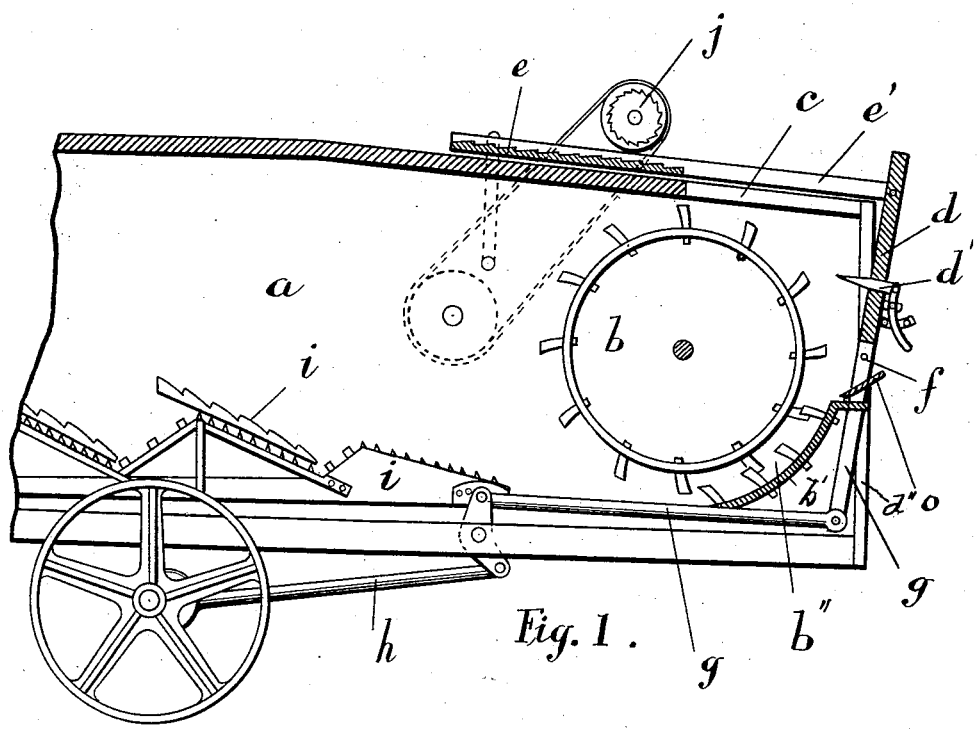
Figure 2:
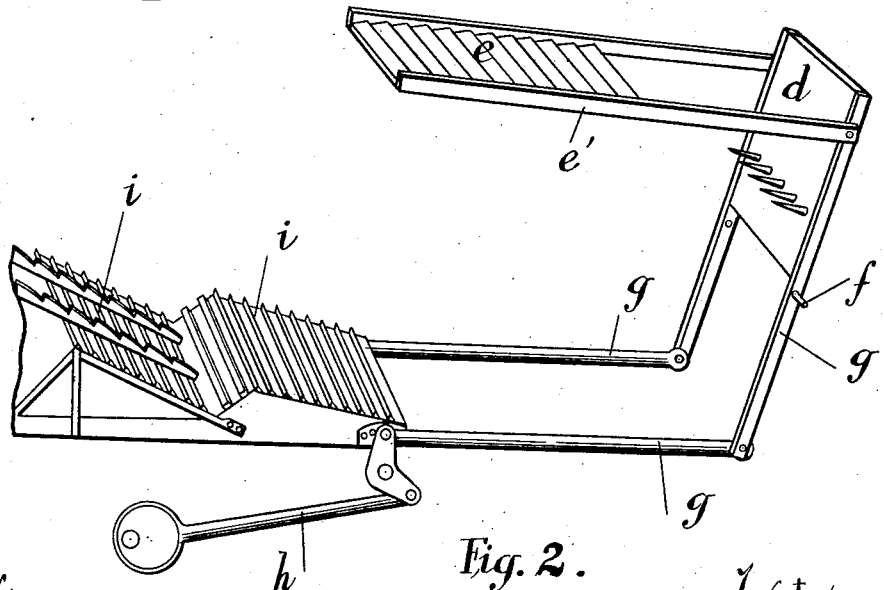

For an understanding of my invention, reference is to be had to the following description and to the accompanying drawings, in which:

Figure 1, is a vertical section on the line $a—a$ Fig. 3; Fig. 2, is a perspective view of the feeder on a larger scale than in Fig. 1; Fig. 3, is a plan view of the feeding end of a threshing machine and feeder; and Fig. 4, is a vertical section similar to Fig. 1, showing a modification of the carrier.

Like characters of reference refer to like parts throughout the specification and drawings.

The toothed cylinder $b$ is revolubly mounted in the threshing chamber $b'$ and on the top of the threshing machine $a$ and in rear of the toothed cylinder $b$ is the carrier which delivers the bundles, sheaves, etc. to the feed opening $c$, to be combed into the concave $b''$, as the cylinder revolves. In front of the cylinder $b$ and above the concave $b''$, is rockably supported a feeder $d$, which, as shown in the drawings, consists of a substantially rectangular element extending across the front of the cylinder and projecting above it so as to press against the cylinder, the bundles delivered into the threshing chamber $b'$ through the feed opening $c$. The feeder $d$ is rockably connected to the inner surfaces of the threshing chamber sides $d''$ by supports $f$, and is provided with an arm, or arms, $g$, preferably attached to the pitman $h$ by which the decks $i$ are shaken, so that the rocking movement of the feeder will be timed to correspond with the shaking movement of the decks. During the action of the pitman $h$, the feeder is alternately moved toward and away from the cylinder $b$.

As shown in Figs. 1 and 3, the carrier consists of a notched deck $e$, connected by arms $e'$ with the feeder $d$, which imparts to it a reciprocating movement during the rocking movement of the feeder. When the feeder moves to its closing position, the feeder deck moves away from the feed opening to receive the next bundle and carry it past the cutters $j$ to the feed opening $c$ when the feeder returns to its opening position. When the feeder moves to its opening position, the carrier delivers the bundle into the feed opening $c$ above the cylinder, and when the bundle is so delivered, the feeder again moves to its closing position to press the bundle against the cylinder and hold it there while being combed away, the feeder being provided with adjustable retainers *d'* which penetrate between the straws of the bundle and maintain it in substantially parallel relation with the length of the cylinder while the combing away is being effected.
The cylinder then is able to positively comb the bundle away in a steady feed without any possibility of becoming slugged, as the feeder in its closing position, restricts any further bundle delivery from the carrier to the cylinder.

In Fig. 4, I have shown a modification of the carrier, which, in this case, consists of a traveling belt or apron *k* to carry the bundles past the band cutters. While this traveling carrier is practical for delivering the bundles to the cylinder, it is not as satisfactory a means of delivery as the carrier deck shown in Figs. 1 and 3, inasmuch as the action of the traveling carrier is continuous, and piles the bundles against the cylinder entrance which necessitates the exercise of careful supervision and good judgment in regulating the delivery of the bundles to the carrier so as not to overtax the combing capacity of the cylinder. With a reciprocating carrier, such as shown in Figs. 1 and 3, the feed of the bundles to the cylinder is in perfect accord with the combing capacity of the cylinder, and the bundles cannot be delivered to the cylinder faster than it is possible to comb them away. I have provided the machine with a movable pan *o* extending across the feeding end of the threshing machine and connected to the feeder arms *g* below the bottom of the feeder but above the top of the concave, to collect the loose grain separated from the material while combed into the concave, and to receive the sweepings and return them through the concave to the machine. During the rocking of the feeder, the feeder arms *g* reciprocate the pan *o* and shake its contents into the concave.

Having thus fully described the nature of my invention, what I claim as new and desire to secure by Letters Patent is:

1. In the hereinbefore described device, in combination, a threshing chamber with a feed opening therein, a threshing cylinder in said chamber, a feeder, and means for moving the feeder alternately into opening and closing positions with relation to the chamber, said feeder having means thereon to hold the material while being combed away by the cylinder.

2. In the hereinbefore described device, in combination, a threshing chamber, a toothed cylinder therein, said threshing chamber having a feed opening through which the bundles are delivered to the cylinder, a feeder associated with the cylinder, and means for alternately moving the feeder into a position to permit of the entry of the bundles between the cylinder and feeder and then to a position to press the bundle against the cylinder.

3. In the hereinbefore described device, in combination, a threshing chamber, a toothed cylinder therein, said threshing chamber having a feed opening through which the bundles are delivered to the cylinder, a feeder rockably connected to the threshing chamber in front of the cylinder, and means for alternately moving the feeder into operative and inoperative relations with the cylinder, said feeder having means thereon for holding the material while it is being combed away by the cylinder.

Toronto, November 30th, 1911.

WILLIAM J. HUTCHINSON.

Signed in the presence of—
 CHAS. H. RICHES,
 EDWARD BERNSTEIN.